(12) United States Patent
Amstutz et al.

(10) Patent No.: US 7,783,446 B2
(45) Date of Patent: Aug. 24, 2010

(54) MEASURING SYSTEM COMPRISING VARIABLY SENSITIVE OUTPUTS

(75) Inventors: Leo Amstutz, Neftenbach (CH); Max P. Waser, Hittnau (CH); Paul Engeler, Frauenfeld (CH)

(73) Assignee: Kistler Holding, AG, Winterthur (CH)

( * ) Notice: Subject to any disclaimer, the term of this patent is extended or adjusted under 35 U.S.C. 154(b) by 483 days.

(21) Appl. No.: 11/587,457

(22) PCT Filed: Apr. 28, 2005

(86) PCT No.: PCT/CH2005/000238

§ 371 (c)(1),
(2), (4) Date: Feb. 4, 2008

(87) PCT Pub. No.: WO2005/108929

PCT Pub. Date: Nov. 17, 2005

(65) Prior Publication Data

US 2008/0300812 A1    Dec. 4, 2008

(30) Foreign Application Priority Data

May 7, 2004    (CH) ..................................... 806/04

(51) Int. Cl.
G01C 19/00    (2006.01)
H01L 41/00    (2006.01)
G01P 15/09    (2006.01)

(52) U.S. Cl. ..................... 702/104; 310/319; 73/514.34
(58) Field of Classification Search ................. 702/104; 330/9, 69, 174; 327/307; 310/319; 73/514.34
See application file for complete search history.

(56) References Cited

U.S. PATENT DOCUMENTS

| | | | |
|---|---|---|---|
| 4,009,447 A * | 2/1977 | Wolf et al. ................... 330/110 |
| 4,198,607 A | 4/1980 | Beinitz et al. | |
| 6,714,070 B1 * | 3/2004 | Smith .......................... 330/69 |
| 2004/0010389 A1 | 1/2004 | Makino et al. | |

FOREIGN PATENT DOCUMENTS

| | | |
|---|---|---|
| CH | 681755 | 5/1993 |
| EP | 0092746 A1 | 11/1983 |

* cited by examiner

*Primary Examiner*—Bryan Bui
(74) *Attorney, Agent, or Firm*—Dority & Manning, P.A.

(57) ABSTRACT

A measuring system includes a piezoelectric sensor, two or more charge amplifiers that are provided with different amplification settings and one respective output, and a signal splitter which is disposed between the sensor and the amplifiers. A charge signal received by the piezoelectric sensor is subdivided into two or more partial signals on the signal splitter during a measurement, and each of two or more partial signals is fed to one of the charge amplifiers, is processed therein, and is finally fed to the outputs. The signal splitter preferably encompasses two or more capacitors. The inventive measuring system is used above all for measuring forces, pressures, extensions/expansions, moments, or accelerations.

17 Claims, 3 Drawing Sheets

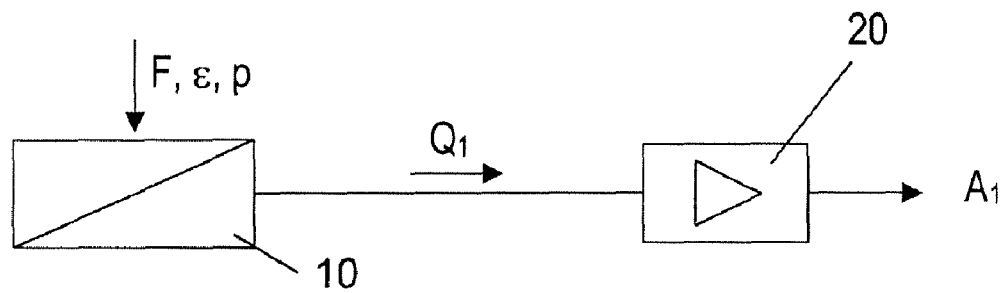
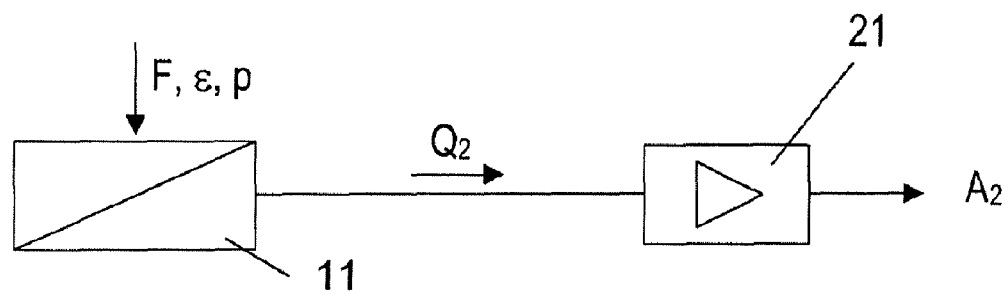
Fig. 1    PRIOR ART
Fig. 2    PRIOR ART

MEASURING SYSTEM COMPRISING VARIABLY SENSITIVE OUTPUTS

CROSS-REFERENCE TO RELATED APPLICATIONS

This application claims priority to International Application Serial No. PCT/CH2005/000238 filed Apr. 28, 2005, which claims priority to Swiss Application No. 806/04 filed 7 May 2004.

BACKGROUND

The invention relates to a measurement setup for measuring physical values which has two or more outputs with different resolution levels comprising a piezoelectrical sensor and two or more amplifiers.

Measurement setups essentially comprise a sensor for sensing and converting a signal and an amplifier for amplifying the signal before it is transmitted to the output. Depending on the application, different amplifications or conversion factors of measurement signals are required. Usually an amplifier can be adjusted according to need: a high sensitivity can be chosen whereby the resolution will be very high but the total measurement range very narrow, or a low sensitivity can be selected so that the resolution is very low but the total measurement range is very broad.

Certain applications, however, require different resolution rates at different times. For example, in monitoring the distribution of forces of injection moulding or die casting machines while the mould halves are clamped for the injection and cooling operations very high maximum forces are measured. It must be assured, on the other hand, that during the closing operation the space between the mould halves is empty, i.e. that in particular no part to be removed has been caught and could damage the mould during the closing. For this purpose, the resolution of the force signal is required to be about 50 to 100 times higher than that of the signal in the closed state.

Another application example of the requirement to measure both a highly resolving weak signal and to monitor and evaluate a very strong signal is the field of ballistics.

Therefore, there is a need to monitor both high and low amplitudes with nearly identical resolutions relative to the amplitudes.

According to the prior art, for example, two measuring chains each having a sensor and an amplifier are used for this purpose which can be set individually. While one of the measuring chains is suitable for reproducing low forces in a low range and with a high resolution the other measuring chain is adapted to reproducing high forces with a high amplitude and low resolution. The first measuring chain turns to saturation with increasing forces. A disadvantage of a setup of this type is the space requirement for the two sensors, the need of double installation and the costs of two complete measuring chains.

FIG. 1 represents two measuring chains according to the prior art which are independent of each other and arranged in parallel each measuring chain consisting of a sensor 10 and 11 and an amplifier 20 and 21 wherein the amplifiers have different sensitivities so that the charge signals Q1 and Q2 sensed at the sensors 10 and 11, for example due to forces acting thereon, have different signal amounts and sensitivities at the outputs A1 and A2, respectively, of the amplifiers 20 and 21. Two complete setups are required for these measuring chains, in particular two sensors 10 and 11 both of which must be installed. Although this solution is very costly it has been employed.

Another possibility is to use only one measuring chain wherein the amplifier must be switched over to a new desired sensitivity at an appropriate time. A disadvantage of this setup is the discontinuity of the course of the measurement as well as the difficulty to find the right point of time for switching over.

FIG. 2 shows another setup of a measuring chain according to the prior art. This measuring chain comprises only one sensor 10 and an amplifier 20, 21 with a setting means 30 for the amplifier 20, 21 whereby depending on the setting the only one terminal A can correspond to the sensitivity of the first sensor 20 or of the second sensor 21 of FIG. 1. This arrangement has the disadvantage that at any give time a charge signal Q can be amplified only with a high sensitivity or with a low sensitivity and that indication means are required which determine time of switching over.

It is also possible to evaluate a partial signal superposed on an electrical signal as already described in CH 681755. However, since the partial signal is not related to the same zero point as the basic signal this procedure is unsuitable for the applications and requirements described herein.

OBJECTS AND SUMMARY OF THE DISCLOSURE

It is the object of the present invention to suggest a measuring chain of the type described above which has two or more outputs with different sensitivities.

It is another object of the present invention to suggest a device for the measurement of forces, pressures, strain, moments or accelerations having two or more outputs with different sensitivities.

The measurement setup according to the invention comprises a piezoelectrical sensor and two or more charge amplifiers with different amplification settings, each of which has a terminal, as well as a signal splitter arranged between the sensor and the amplifiers. During a measurement, a charge signal sensed by the piezoelectrical sensor is split into two or more partial signals each of which is transmitted and processed in one of the charge amplifiers and eventually is transmitted to the terminals. The signal splitter preferably comprises two or more capacitors. The measurement setup with the piezoelectrical sensor primarily serves for the measurement of forces, pressures, strain, moments or accelerations.

BRIEF DESCRIPTION OF THE DRAWINGS

The invention will be explained referring to the following drawings which show

FIG. 1 a schematic representation of a measurement setup according to the prior art;

FIG. 2 another schematic representation of a measurement setup according to the prior art;

DETAILED DESCRIPTION OF THE EMBODIMENTS OF THE DISCLOSURE

Figure 3:
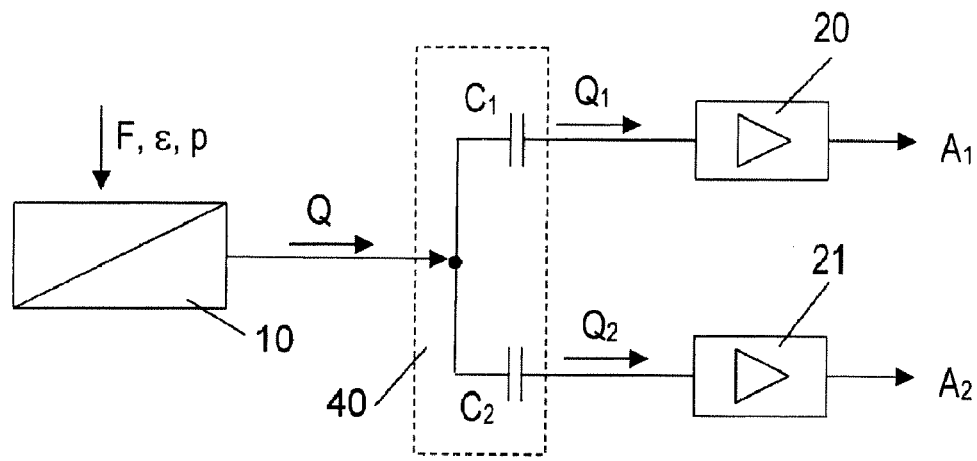
FIG. 3 a schematic representation of a measurement setup according to the invention.

FIG. 3 represents schematically the setup of a measuring chain according to the invention. The measurement setup comprises a piezoelectrical sensor 10 and serves primarily for the measurement of forces, pressures, strain, moments or accelerations. Furthermore, the measurement setup comprises two charge amplifiers 20 and 21 with different amplifications each having an output terminal A1 and A2, as well as a signal splitter 40 arranged between the sensor 10 and the amplifiers 20 and 21. During a measurement a charge signal Q transmitted from the piezoelectrical sensor 10 is split by the signal splitter 40 in two partial signals Q1 and Q2 each of which is transmitted and processed in one of the charge amplifiers 20 and 21 and is finally fed to the outputs A1 and A2. Since the charge signal Q from the piezoelectrical sensor is a very-high impedance signal, the signal splitter 40 preferably comprises two suitably arranged capacitors C1 and C2. The capacities of the capacitors C1 and C2 should preferably be at least 10 times higher than the combined capacities of the wire and the sensor.

By the setup according to the invention two or more charge amplifiers 20, 21 can be connected with exactly one sensor 10. Charge amplifiers 20, 21 cannot be connected directly at the input. The measurement setup according to the invention is achieved by appropriately arranged capacitors C1 and C2 which form the signal splitter 40 owing to the virtual zero point at the charge amplifier input. This signal splitter 40, however, is distorted by the capacity of the input lead and the sensor. By appropriately dimensioning the signal splitter 40 the errors can be kept small or can be balanced and the charges can be distributed to the charge amplifiers 20, 21 so that high and low signals can be measured at the same time. If identical capacitors C1, C2 are provided an error of the same amount will be obtained in both channels.

Therefore, the capacities of capacitors C1, C2 are similar and preferably differ from each other at most by a factor of 10. In accordance with the capacities also the charge signals Q1 and Q2 are identical or similar.

For example, the amplifications of the charge amplifiers 20, 21 differ by a factor of up to 100. In this way, the sensitivity of terminal A1 is for example 1000 times higher than that of terminal A2 while the range of the charge amplifier is higher than the range of charge amplifier 20 by the same factor. But a difference in sensitivity in the range of a factor 100 is typical.

Figure 4:
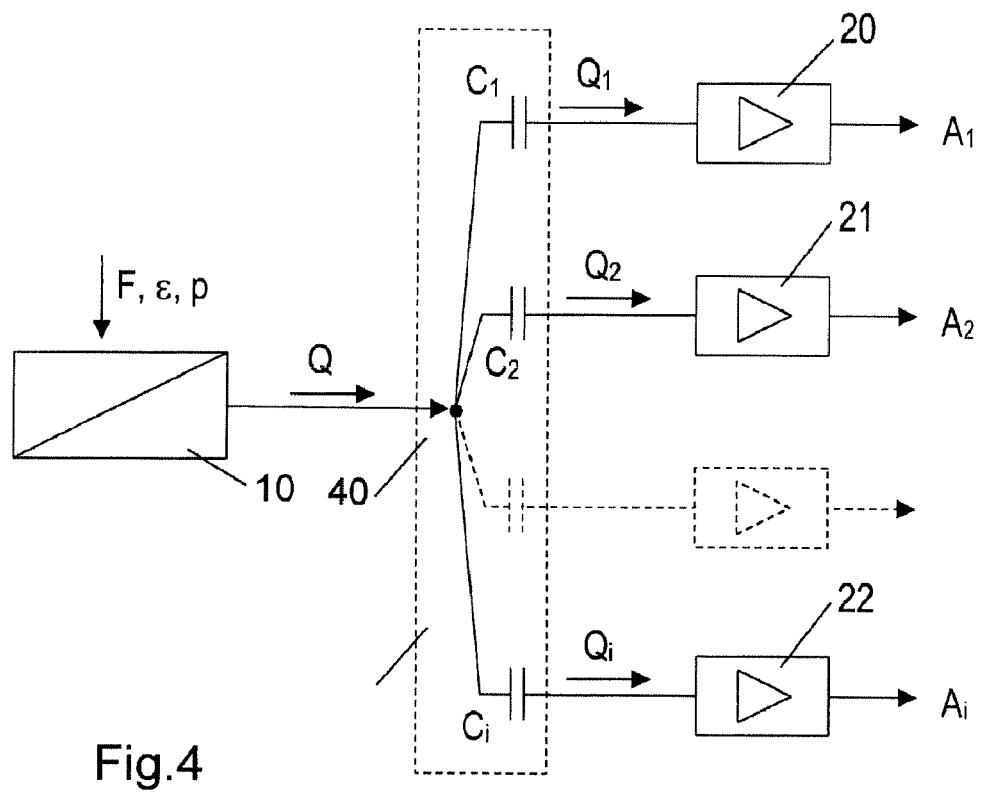
FIG. 4 another schematic representation of a measurement setup according to the invention.

FIG. 4 shows the same setup according to the invention as FIG. 3 wherein the signal splitter 40 divides the original charge signal Q by means of several capacitors C1, C2, Ci in several partial charge signals Q1, Q2, Qi. Accordingly, this measuring chain contains several charge amplifiers 20, 21, 22 and several outputs A1, A2, Ai.

Figure 5:
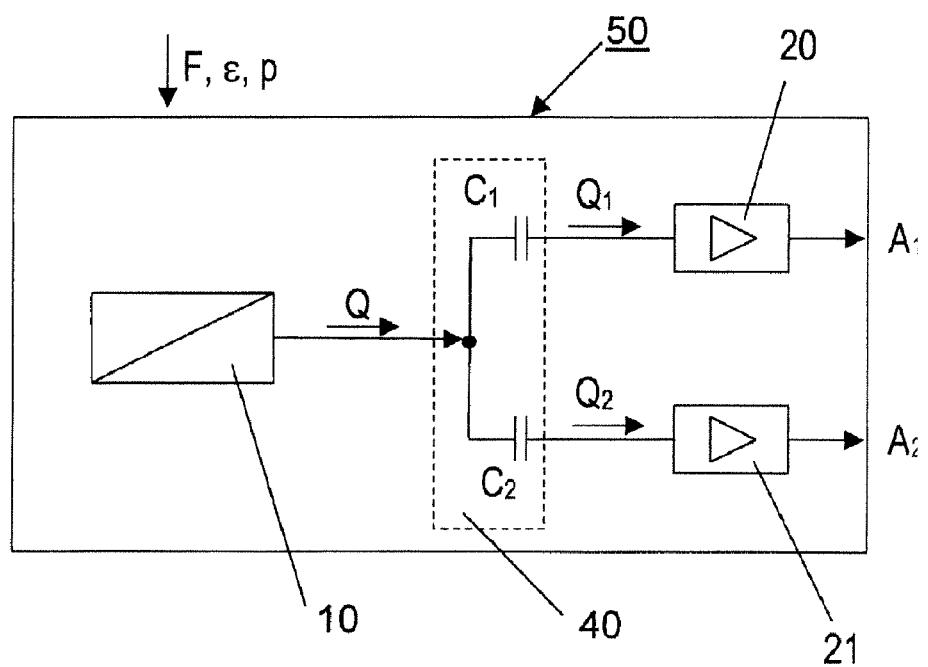
FIG. 5 a schematic representation of a device according to the invention.

FIG. 5 represents a device 50 comprising the whole measurement setup according to FIG. 3 with two outputs A1 and A2 where the sensor is integrated. Consequently, a device 50 can also house a measurement setup according to FIG. 4 and can have several outputs A.

Whether used as a measuring chain or as a device 50, the advantage of this arrangement is that no switching over of an amplifier unit is required and that all signals at the outputs A1, A2, and A3 can be read simultaneously. Another advantage of this measuring chain according to the invention or this device according to the invention is that it requires only one sensor whereby the costs and the effort for the measurement are kept low.

Furthermore, there is the possibility to combine the measurement setup of the invention with that of CH 681755. This enables an additional zoom function in any range, the zero point in this case being irrelevant.

LIST OF DESIGNATIONS 10 piezoelectrical sensor
11 second piezoelectrical sensor
20 first charge amplifier
21 second charge amplifier
22 further charge amplifier
30 switch-over means of the amplifier unit
40 signal splitter
50 device
A output
C capacitor
Q charge signal
F force
$\epsilon$ strain
P pressure

The invention claimed is:

1. A measurement setup for measuring physical values which has two or more outputs with different sensitivity levels comprising a piezoelectrical sensor and two or more charge amplifiers with different amplification settings wherein between the sensor and the charge amplifiers is arranged a signal splitter which during a measurement can split a charge signal from the sensor into partial signals so that each of the partial signals can be processed in one of the charge amplifiers.

2. A measurement setup according to claim 1, wherein the sensor can measure forces, pressures, strain, moments, or accelerations.

3. A device comprising a measurement setup according to claim 2, wherein in the signal splitter a capacitor is arranged electrically in series with each charge amplifier.

4. A device according to claim 3, wherein the capacitances of the capacitors are in the same order of magnitude and differ from each other by no more than a factor of 10.

5. A device comprising a measurement setup according to claim 2, wherein the sensitivities of the outputs differ by a factor of no more than 1000.

6. A device according to claim 3, wherein the amplification settings of the charge amplifier differ by no more than a factor of 100.

7. A device according to claim 3, wherein the sensitivities of the outputs differ by a factor of no more than 1000.

8. A measurement setup according to claim 1 wherein in the signal splitter a capacitor is arranged electrically in series with each charge amplifier.

9. A measurement setup according to claim 8 wherein the capacitances of the capacitors are in the same order of magnitude and differ from each other at most by a factor of 10.

10. A device comprising a measurement setup according to claim 9, wherein the sensitivities of the outputs differ by a factor of no more than 1000.

11. A measurement setup according to claim 9, wherein the amplification settings of the charge amplifier differ by a factor of up to 100 times.

12. A measurement setup according to claim 8 wherein the amplification settings of the charge amplifier differ by a factor of up to 100 times.

13. A device comprising a measurement setup according to claim 12, wherein the sensitivities of the outputs differ by a factor of no more than 1000.

14. A device comprising a measurement setup according to claim 8, wherein the sensitivities of the outputs differ by a factor of no more than 1000.

15. A measurement setup according to claim 1, wherein the sensitivities of the outputs differ by a factor of up to 1000.

16. A device comprising a measurement setup according to claim 1, wherein the sensor can measure forces, pressures, strain, moments, or accelerations.

17. A device according to claim 16, wherein the sensitivities of the outputs differ by a factor of no more than 1000.

* * * * *